US006779755B1

(12) United States Patent
Thomsen

(10) Patent No.: US 6,779,755 B1
(45) Date of Patent: Aug. 24, 2004

(54) ADJUSTABLE MOUNT FOR A MODEL AIRPLANE ENGINE

(76) Inventor: Helge K. Thomsen, 24 Clinton Dr., Mohnton, PA (US) 19540

( * ) Notice: Subject to any disclaimer, the term of this patent is extended or adjusted under 35 U.S.C. 154(b) by 0 days.

(21) Appl. No.: 10/408,932

(22) Filed: Apr. 8, 2003

Related U.S. Application Data

(60) Provisional application No. 60/456,336, filed on Mar. 20, 2003.

(51) Int. Cl.[7] ............................................ B64D 27/00

(52) U.S. Cl. ........................... 244/54; 446/57; 248/554

(58) Field of Search ............................ 244/54, 55, 56, 244/66, 51; 446/57–58; 248/554–557; 403/374.3, 374.2, 314

(56) References Cited

U.S. PATENT DOCUMENTS 3,891,169 A * 6/1975 Temarco ........................ 248/5
3,914,899 A 10/1975 Mabuchi
D246,921 S * 1/1978 Moline ......................... 244/54
4,222,280 A * 9/1980 Stewart ........................ 244/54
4,249,711 A 2/1981 Godbersen
5,238,205 A 8/1993 Gleichauf
5,263,351 A * 11/1993 Berg, III ..................... 403/374
5,505,423 A 4/1996 Kusijanovic
5,784,813 A * 7/1998 Balassa et al. .............. 403/374
6,036,163 A * 3/2000 Yamada ....................... 244/54

* cited by examiner

*Primary Examiner*—Galen Barefoot
(74) *Attorney, Agent, or Firm*—King & Schickli, PLLC

(57) ABSTRACT

An adjustable mount for intended use with a model airplane engine is disclosed. The mount includes a bracket for supporting the engine and a base for connecting to the airplane, such as along the firewall. In one embodiment, the base includes a generally concave surface along one side that matches a generally convex surface along the corresponding side of the bracket. This arrangement allows the bracket to be moved relative to the base to change the orientation of an axis of rotation of the engine crankshaft with a position of one end of the shaft remaining substantially the same. A wedge assembly for fixing the position of the bracket relative to the base is also disclosed.

20 Claims, 4 Drawing Sheets

ADJUSTABLE MOUNT FOR A MODEL AIRPLANE ENGINE

This application claims the benefit of U.S. Provisional Application No. 60/456,336, filed Mar. 20, 2003.

TECHNICAL FIELD

The present invention relates to engine mounts and, more particularly, to a selectively adjustable mount for intended use with a model airplane engine.

BACKGROUND OF THE INVENTION

Building scale model airplanes and flying them via remote control has become an increasingly popular hobby in recent years. During this time, modern technological advances have resulted in highly sophisticated, wireless remote control systems for use with such airplanes. As a result of these systems, the hobbyist is now able to fly the airplane at higher speeds and maneuver it remotely with greater accuracy and with less risk of catastrophe than heretofore possible.

Despite these advances, a problem that continues to plague the hobbyist is getting the airplane to simply fly straight ahead when the airfoils (wing flaps, rudders, etc.) are in the nominal or home position. If the axis of rotation of the engine crankshaft is aligned with the centerline of the airplane's fuselage, the torque introduced into the system by the rotation of the propeller causes the airplane to deviate from a straight flight path, and instead tend to fly in a direction opposite to the direction in which the propellor rotates. Usually, the direction of propeller rotation is clockwise when viewed from the rear of the airplane, which causes the airplane to turn to the left and climb when the axis of rotation and fuselage centerline are coextensive.

To counteract this force, the hobbyist can "trim" the plane, such as by adjusting the position or orientation of one or more of the airfoils controlling the flight path. Trimming is normally done on a "trial and error" basis, and depends on the speed of the aircraft. Also, level flight at one speed will result in a climb at a higher speed. Consequently, finding the correct adjustment to create a consistently straight flight path via trimming can be not only frustrating to the hobbyist, but also time-consuming. Moreover, trimming does not really solve the problem with any degree of permanency, as changing out the engine would necessitate starting the process all over again. Furthermore, the amount to which the airfoils can be trimmed is finite, and in some extreme cases, the maximum amount of trimming still might not solve the problem.

Instead of trimming the airplane, another option is to physically relocate the engine (which is typically mounted to a "firewall") so that the axis of rotation of the crankshaft is not aligned with the centerline of the fuselage. Relocating the engine is a laborious process, since it typically involves detaching a separate mount from the firewall and then reattaching it at a new position estimated to correct the problem. As should be appreciated, making even a single change is time-consuming, and can be difficult to accomplish in the field (and in some cases, it may be necessary to reposition the engine several times to achieve the desired result).

Furthermore, if the adjustment is significant, the "new" position of the engine causes the position of the crankshaft to change such that it is no longer in the center of the opening provided in the cowling or cover and may actually interfere with this structure. Making a corresponding adjustment to the position of the cowling or cover is an option, but this is likewise difficult and time-consuming. Having an offset cowling or cover also deleteriously reduces the aesthetic appeal of the airplane (in which most hobbyists take great pride).

In the past, others have proposed adjustable engine mounts for use in model airplanes, but none of which I am aware overcome the foregoing problems. One of the more modem proposals is found in U.S. Pat. No. 5,505,423 to Kusijanovic, the disclosure of which is incorporated herein by reference. Although the mount disclosed in this patent is adjustable in a sense, the range of adjustment permitted is limited. Making the adjustment also requires first loosening a nut on a bolt axially aligned with the crankshaft of the engine, which is difficult to accomplish with the engine in the mounted position. The nature of the mount is also such that an adjustment to the orientation of the axis of rotation of the crankshaft results in a significant positional shift at the tip, which of course is operatively connected to or operatively associated with the propeller. Hence, even if an adjustment is made using this mount to change the orientation of the axis of rotation of the crankshaft it may still be necessary to make a deleterious positional adjustment to the cowling or cover to make sure that the opening in it accommodates the "new" position of the crankshaft.

Accordingly, a need for an improved mount for use with a model airplane engine is identified. Permitting a wide range of adjustment in an easy and efficient manner would be a hallmark of the mount. The mount would also advantageously allow for an adjustment to be made to the orientation of the axis of rotation of the engine crankshaft without the need for a concomitant adjustment to the position of the cowling or cover forming part of the fuselage. The mount would also be simple and inexpensive to manufacture and would be universal in application.

SUMMARY OF THE INVENTION

In accordance with a first aspect of the invention, an adjustable mount for intended use with an engine for a model airplane having a fuselage and a firewall is disclosed. The engine rotates a shaft operatively connected to or associated with a propeller about an axis of rotation, and the mount comprises a bracket capable of supporting the engine. The bracket includes a generally convex surface. A base having a first surface adapted for mating with the firewall is coupled to the bracket. The base includes a second, generally concave surface opposite the first surface for mating with the convex surface of the bracket. As a result of this arrangement, the bracket may be moved relative to the base to adjust/change the orientation of the axis of rotation, with a point along or at one end of the shaft remaining at substantially the same position. Consequently, the possible need for a corresponding adjustment to the cowling or cover forming part of the fuselage characteristic of prior art adjustable mounts is eliminated.

In one embodiment, the bracket comprises a body including the generally convex surface and a pair of arms adapted for supporting the engine. Each arm may be substantially L-shaped, and the mount may further include at least one fastener for securing the arm to the body. The bracket includes an opening through which a portion of a first connector extends. The first connector extending through the opening is secured at one end to the base and includes an oversized head at an opposite end.

The mount may further comprise a first wedge part on the first connector. The first wedge part is associated with a structure having at least one dimension that exceeds a corresponding dimension of the opening in the bracket. A second wedge part is also provided on the first connector. The second wedge part has a first side for engaging the first wedge part and a second side generally opposite the first side for engaging the oversized head. A second connector oriented generally transverse to the first connector connects the first and second wedge parts. Upon tightening the second connector, the first and second wedge parts urge the bracket into engagement with the base by wedging action to thus fix the orientation of the axis of rotation.

Preferably, the second connector is elongated in a direction substantially perpendicular to the axis of rotation when the engine is substantially aligned with a centerline of the airplane fuselage. The structure associated with the first wedge part may be a washer having a convex surface for engaging a concave surface of the bracket surrounding the opening. Alternatively, the first wedge part may be provided with a peripheral flange.

In accordance with a second aspect of the invention, an adjustable mount for intended use with an engine for a model airplane having a fuselage and a firewall is disclosed. The engine rotates a shaft operatively connected to or associated with a propeller about an axis of rotation. The mount comprises a bracket for supporting the engine and a base adapted for mounting to the firewall and mating with the bracket. A first connector is operatively connected to or associated with the base, and matching first and second wedge parts are carried on the first connector. A second connector oriented generally transverse to the first connector is provided for connecting the first and second wedge parts. Upon tightening the second connector, the first and second wedge parts urge the bracket into engagement with the base by wedging action to thus fix the orientation of the axis of rotation.

In one embodiment, the bracket includes an opening and at least one dimension of a structure associated with the first wedge part exceeds a corresponding dimension of the opening. Consequently, the first wedge part is captured between the bracket and the second wedge part. The first connector preferably includes an oversized head at one end for capturing the wedge parts. The first connector also passes through a hole in the base and includes a second oversized head at the opposite end. The second connector is elongated in a direction substantially perpendicular to the axis of rotation of the shaft when the engine is substantially aligned with a centerline of the fuselage of the airplane.

The bracket may include a generally convex surface. The base may include a first surface adapted for mating with the firewall and a generally concave surface opposite the first surface for mating with the convex surface of the bracket. As a consequence of this arrangement, the bracket may be moved relative to the base to adjust or change the orientation of the axis of rotation with a position of a point along or at the tip of the shaft remaining substantially the same. The bracket may comprise a body including the generally convex surface and a pair of arms for supporting the engine.

In accordance with a third aspect of the invention, an adjustable mount for intended use with an engine for a model airplane having a firewall and a fuselage is disclosed. The engine rotates a shaft operatively connected to or associated with a propeller about an axis of rotation. The mount comprises means for adjusting or changing the orientation of the orientation of the axis of rotation and means for fixing the orientation of the axis of rotation.

In one embodiment, the adjusting means comprises a bracket for supporting the engine. The bracket includes a generally convex surface. A base coupled to the bracket includes a first surface adapted for mating with the firewall and a second, generally concave surface opposite the first surface for mating with the convex surface of the bracket. The fixing means may comprise a first connector operatively connected to or associated with the base and passing through an opening in the bracket; a first wedge part carried on the first connector; a matching second wedge part carried on the first connector; and a second connector oriented generally transverse to the first connector for connecting the first and second wedge parts. Upon tightening the second connector, the first and second wedge parts urge the bracket into engagement with the base by wedging action to thus fix the orientation of the axis of rotation. One of a washer having a convex surface for engaging a concave surface of the bracket surrounding the opening or a peripheral flange on the first wedge part may be associated with the first wedge part to prevent it from passing through the opening.

In accordance with a fourth aspect of the invention, a method of adjusting the orientation of an axis of rotation of a rotatable shaft in an engine operatively associated with a propeller on a model airplane is disclosed. The method comprises changing the orientation of the axis of rotation with a position of one end of the shaft remaining substantially the same. The method may further comprise fixing the orientation of the axis of rotation using a connector elongated in a direction generally perpendicular to the axis of rotation.

BRIEF DESCRIPTION OF THE DRAWINGS

The accompanying drawings incorporated in and forming a part of the specification illustrate several aspects of the present invention and, together with the description, serve to explain the principles of the invention.

In the drawings.

DETAILED DESCRIPTION OF THE PREFERRED EMBODIMENT

Figure 1:
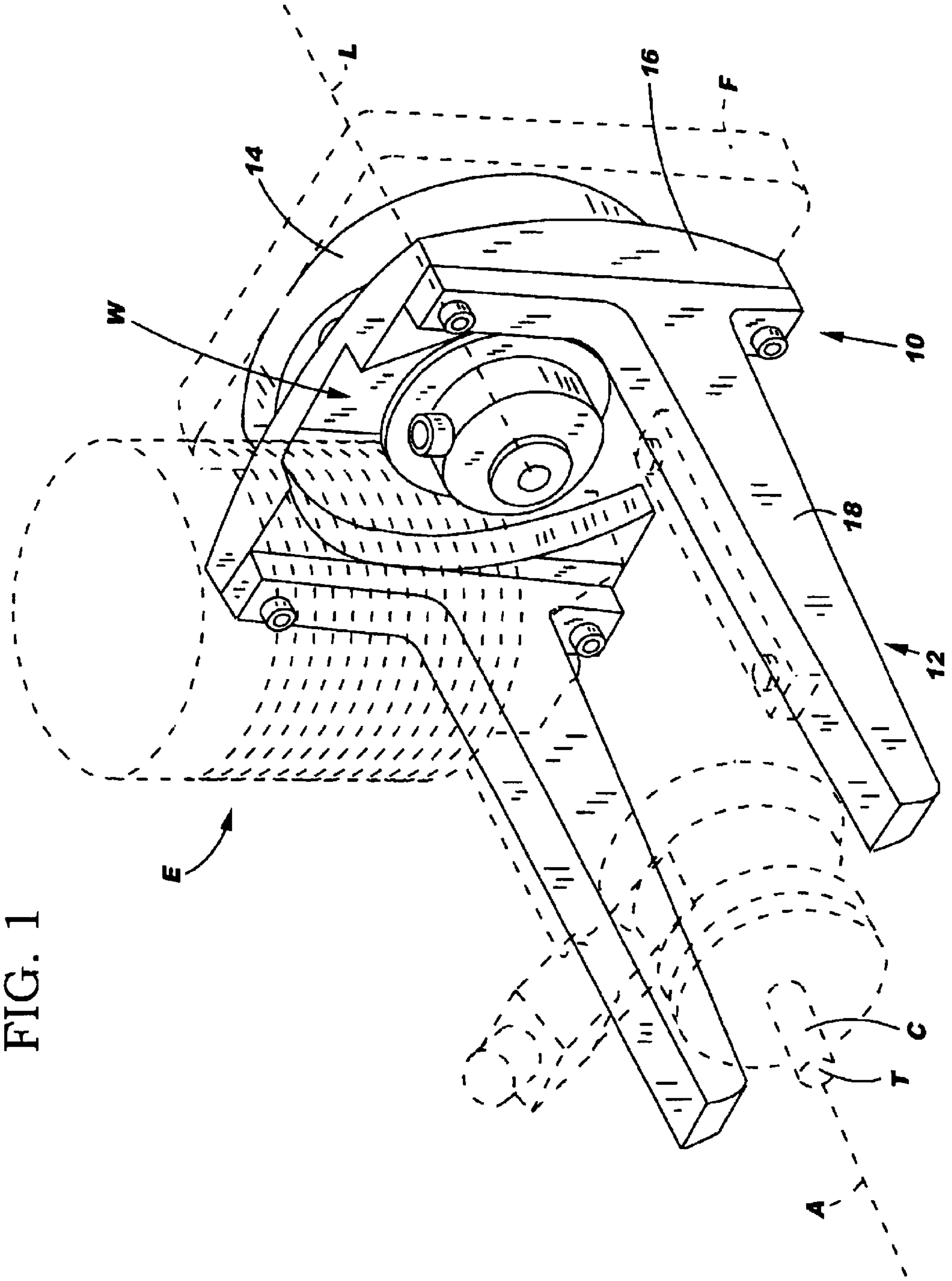
FIG. 1 is a perspective view of one possible and preferred embodiment of the mount disclosed and described herein.

Reference is now made to FIG. 1 of the drawings, which is a perspective view of the preferred embodiment of the adjustable mount 10. The mount 10 is designed for use in a model airplane (not shown) including a stable support structure (such as a firewall F) at one end, adjacent to which an engine E is mounted. The engine E is typically a two or four cycle, internal combustion engine and includes a "prop" shaft or crankshaft C that rotates about an axis of rotation A. In a nominal position, the axis of rotation A is preferably aligned with and generally parallel to the centerline L of the fuselage, such that the tip or proximal end of the crankshaft C extends through and is generally centered in an opening provided in a cowling or cover forming part of the fuselage (not shown). The tip T or end of the crankshaft C is operatively connected to or otherwise associated with the propeller for causing it to rotate in one direction (usually clockwise when viewed from the front) and propel the airplane forward.

Figure 2:
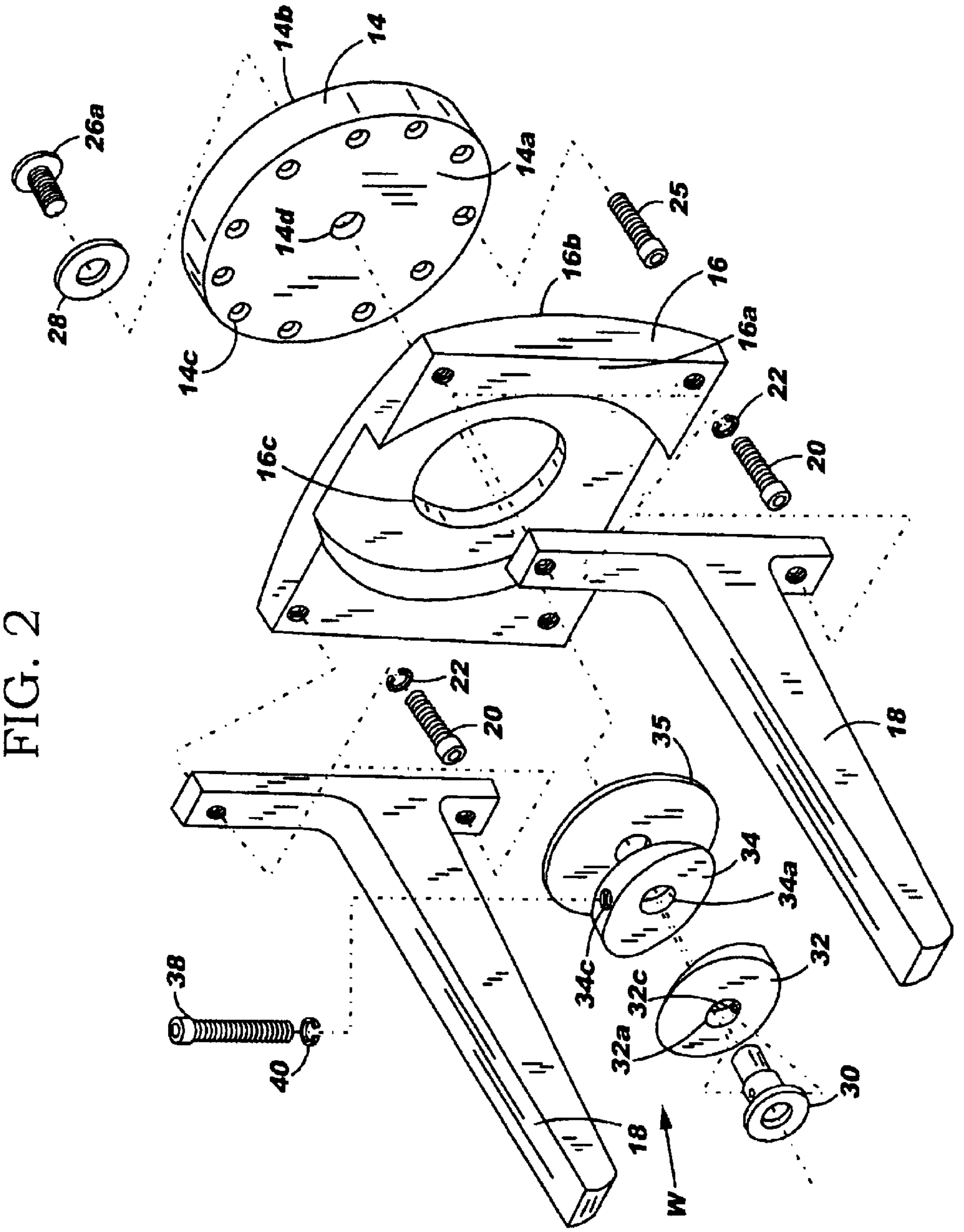
FIG. 2 is an exploded view of the mount of FIG. 1.

Turning to FIG. 2, the mount 10 in the illustrated embodiment is comprised of two main components: a bracket 12 for supporting the engine E and a base 14 forming an interface between the bracket and the firewall F. The bracket includes a body 16 or body portion that supports a pair of spaced arms 18. The arms 18 are generally L-shaped and each include an elongated portion for receiving and supporting the engine E (which typically includes opposed wings or extensions adapted for resting on the arms in an attached position). In the illustrated embodiment, the arms 18 are attached to a first side 16*a* of the body 16 by suitable fasteners, such as threaded bolts 20, inserted in correspondingly threaded apertures. Locking structures or washers 22 may also be used with the fasteners, as necessary or desired.

As perhaps best understood with reference not only to FIG. 2, but also to FIGS. 2*a* and 3*a*–3*c*, and with the side of the firewall F facing the viewer as the reference point, the base 14 includes: (1) a first side 14*a* adapted for engaging the body 16 of the bracket 12; and (2) a second, opposite side 14*b* adapted for engaging the firewall F. More specifically, the first side 14*a* provides a surface for mating with the corresponding generally planar surface of the firewall F, and the opposite or second side 14*b* includes a generally spherical, concave (inwardly bowed) surface for mating with the second side 16*b* of the body 16, which is generally spherical and convex (outwardly bowed). The base 14 also includes a plurality of apertures 14*c* adapted for receiving fasteners 25 (see FIGS. 2 and 2*a*) for fastening or securing it directly to the firewall F.

The bracket 12 is positioned on a first connector 26 secured to the base 14. In the illustrated embodiment, the first connector 26 comprises a bolt having an oversized head 26*a*. The shank portion of the bolt forming the first connector 26, which is preferably threaded, passes through a hole 14*d* in the base 14 and a corresponding oversized opening 16*c* in the body 16 of the bracket 12. The size of the first hole 14*d* is preferably such that the oversized head 26*a* cannot pass through it (but an oversized washer 28 could be used even if the situation were otherwise). A cap 30 is secured to the end of the first connector 26 opposite the oversized head 26*a*. This cap 30 is preferably tubular and hat-shaped, and thus provides the first connector 26 with a second oversized "head" at the end opposite the first oversized head 26*a*.

Figure 2A:
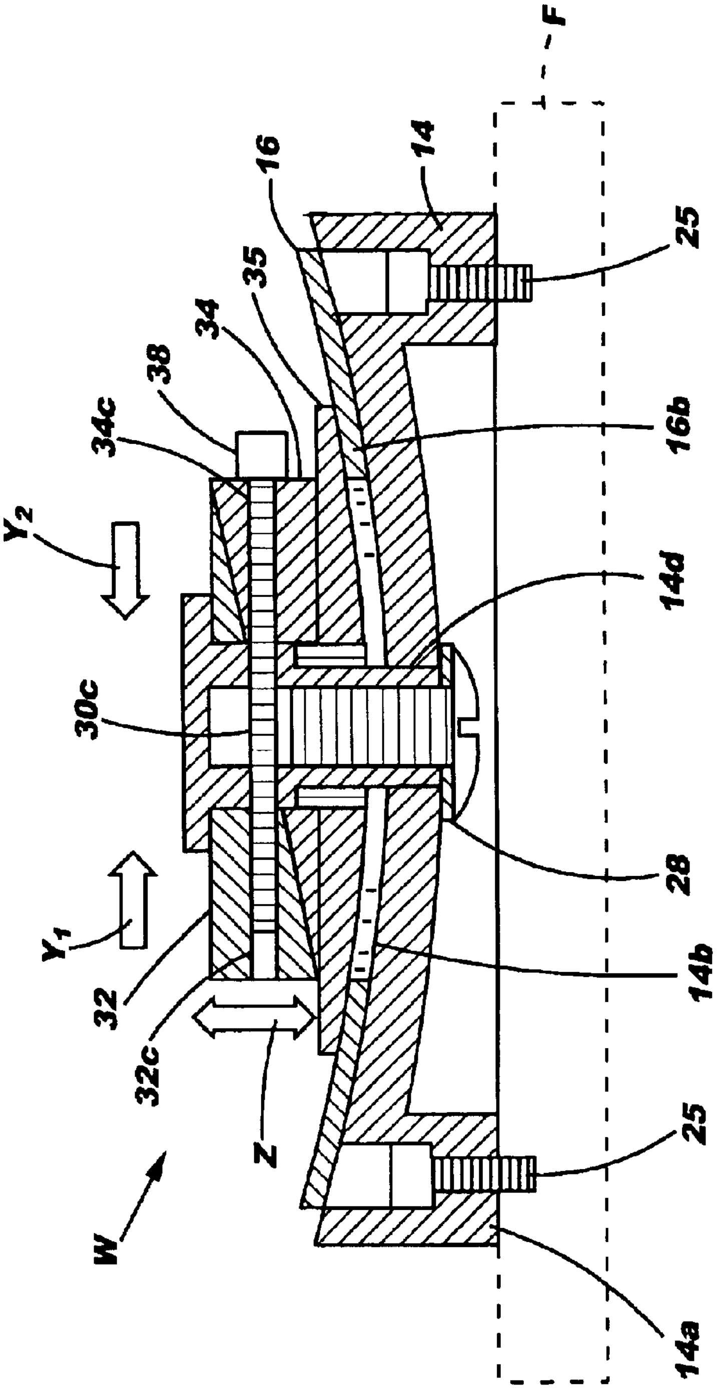
FIG. 2*a* is an enlarged, cross-sectional view of the wedge assembly used to fix the position of the engine supported by the mount.

As perhaps best shown in the cross-sectional view afforded by FIG. 2*a*, a wedge assembly W is carried by the first connector 26 and captured between the body 16 and the cap 30. In one possible embodiment, the wedge assembly W comprises a first wedge part 32 having a slightly oversized or oblong opening through which one end of the first connector 26 passes and sized for receiving a depending portion of the hat-shaped cap 30. One side or surface of the first wedge part 32 is substantially planar, and the opposite side is tapered. As a result of the taper, the wedge part 32 includes a thicker edge at one end and a thinner edge at the other (see FIG. 2*a*).

A corresponding second wedge part 34 also forms part of the wedge assembly W. The second wedge part 34 also includes an oversized or oblong opening 34*a* through which the first connector 26 passes and a tapered side or surface matching the corresponding surface of the first wedge part 32. In one embodiment, the second wedge part 34 is prevented from passing through the opening 16*c* in the body 16 of the bracket 12 by a plate-like washer 35 also carried on the first connector 26. Alternatively, this same function could be accomplished by providing the second wedge part 34 with a peripheral flange. The side of the washer 35 opposite the tapered side of the second wedge part 34 may be slightly convex for engaging the portion of the body 16 surrounding the opening 16*c*, which may be slightly concave as a result of the convexity of the opposite surface 16*b*. As best shown in FIG. 2, this portion of the body 16 is preferably recessed relative to the portions to which the arms 18 are attached. Depending on their positioning, the arms 18 or the corresponding structures to which they are attached may limit the side-to-side movement of the bracket 12 (see FIGS. 3*a*–3*c*).

Each wedge part 32, 34 includes a passage 32*c*, 34*c* extending generally transversely therethrough (that is, in a direction perpendicular to the axis defined by the openings 32*a*, 34*a*). The passages 32*c*, 34*c* extend generally from the periphery of thickest part of the tapered portion of the corresponding wedge part 32, 34 to the opening 32*a*, 34*a* formed therein. Hence, when the wedge parts 32, 34 are brought together in mated engagement (and thus in the illustrated embodiment form a generally cylindrical assembly having matching oblong openings 32*a*, 34*a*), a second connector 38 (such as a threaded bolt having an oversized head) may be passed through the passages 32*c*, 34*c* when aligned. As shown in FIG. 2*a*, the second connector 38 may also pass through a corresponding passage 30*c* formed in the cap 30, if it would otherwise create an obstruction. In the illustrated embodiment, the second connector 38 includes a threaded shank, and the passages 32*c*, 34*c* are also threaded. A locking structure or washer 40 may be used to assist in holding the second connector 38 in the engaged position.

In use, the mount 10 is assembled as described above and secured to the firewall F or like stable support structure associated with the fuselage of the airplane. The fastening is preferably accomplished using at least two fasteners 25 to secure the mount against relative rotation, but more than two can be used if necessary to establish a secure connection. The fasteners 25 are preferably in the form of bolts or screws having oversized heads adapted for being seated or recessed in the corresponding openings 14*c* in the base 14. As should be appreciated from FIG. 2*a*, this prevents the fasteners 25 from interfering with the movement of the bracket 12 relative to the base 14 (but this could also be done by increasing the size of the base, which may be deleterious because of the concomitant increase in weight). The engine E may be attached to the arms 18 after the mount 10 is secured to the firewall F, such that the axis of rotation A is coextensive with the centerline L of the fuselage and the tip T of the crankshaft C is substantially centered in the opening in any cowling or cover present.

Figure 3A:
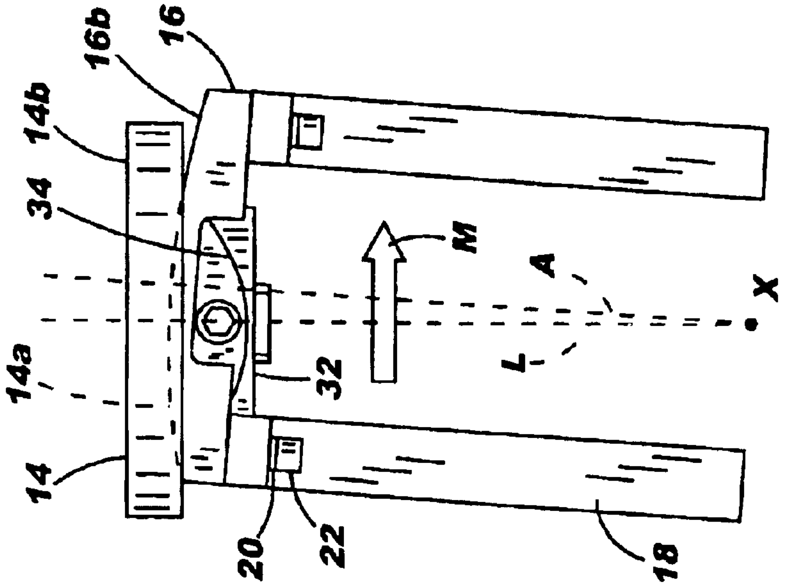
FIGS. 3*a*, 3*b*, and 3*c* are top views illustrating the adjustability of the mount from side-to-side.
Figure 3B:
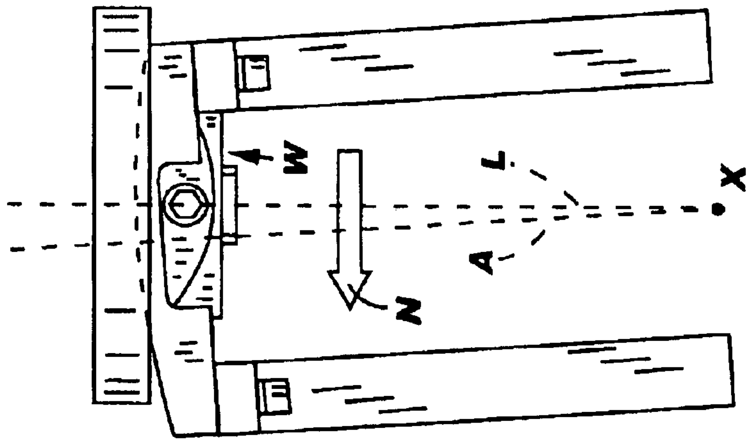

When the second connector 38 is not tightened down, it should be appreciated that, as a result of the oversized nature of the opening 16*c* in the base 16, the bracket 12 is capable of moving relative to the first connector 26 to a limited degree in any direction in the same generally vertical plane relative to the base 14 and the wedge assembly W (which is carried on the first connector 26 operatively connected to the base). Thus, as shown in FIGS. 3*a* and 3*b*, the bracket 12 may be moved to the right or left (note arrows M and N) relative to the base 14, which changes the orientation of the axis of rotation of the crankshaft C in a corresponding direction. However, the base 14 and the first connector 26 remain in the same position. As should be appreciated by a skilled artisan, once the bracket 12 is fixed in place (as discussed further below), any adjustment made helps to offset and counteract the effect of the torque created by the rotation of the propeller in one direction. When the proper adjustment is made, the net effect is "trimming" the airplane to fly straight without any adjustment to the airfoils being made. Thus, by making the appropriate adjustment to the left or right (or up, down, or in any other direction in the same general vertical plane where the matching surfaces are spherical), the airplane can be made to fly straight without dismounting the engine E, and without detaching the mount 10 from the firewall F.

A related advantage provided by the mount 10 is that, as a result of the arrangement of mating convex and concave surfaces, the orientation of the axis of rotation A changes, but a point on the crankshaft C remains at substantially the same position as a result of the concave surface of the base 14 (the particular point depends on the degree of curvature of this surface). In the illustrated embodiment, this point is assumed to be at the end of the crankshaft C. Hence, when the propeller is operatively connected to the end of the crankshaft C, it remains at substantially the same position (although the orientation (tilt) may change). This is perhaps best understood with reference to FIGS. 3*a* and 3*b*, which illustrate that regardless of which direction the bracket 12 is shifted (left or right) to change the orientation of the axis of rotation A relative to the centerline L of the fuselage, the tip T of the crankshaft C (as represented by point X) remains at substantially the same position and only changes slightly (the amount of change depends on the relative degree of convexity/concavity of the matching surfaces). Consequently, in the case where this point on the crankshaft C does not move (or a point along an imaginary axis coextensive with the axis of rotation A of the crankshaft, in the event it is not connected directly to the propeller), the need for moving the cowling or cover with the opening may be eliminated where this point is centered in the opening. This not only makes it substantially easier on the hobbyist to make the positional adjustment, but also maintains the aesthetic appeal of the airplane fully intact and as desired.

Figure 3C:
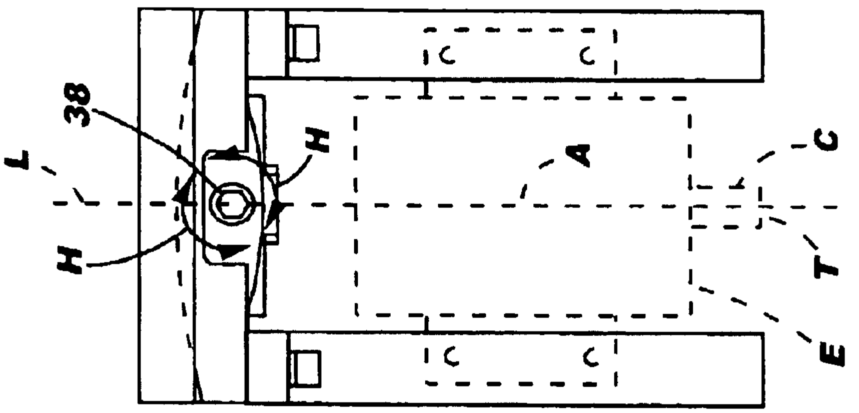

Turning to FIG. 3*c*, once the bracket 12 is moved as desired relative to the base 14 to achieve a particular offset (which may be none, in the case where it is desirable for some reason to keep the axis of rotation A aligned with and parallel to the centerline L, as shown in this figure), it must be fixed in position. To fix the position of the bracket 12 relative to the base 14, the second connector 38 is tightened to draw the first and second wedge parts 32, 34 together. As this occurs, wedging action is created by or between the mating surfaces of these parts 32, 34, which are capable of moving toward one another as the result of the oversized nature of the openings 32*a*, 34*a* (which are preferably oblong in a direction corresponding to the direction of elongation of the second connector 38). This wedging action urges one side of the first wedge part 32 into engagement with the corresponding surface of the cap 30, while one side of the second wedge part 34 is urged against a corresponding surface of the washer 35. The washer 35 in turn engages the corresponding portion of the body 16 forming part of the bracket 12 (note opposed action arrows $Y_1$ and $Y_2$ in FIG. 2*c*, as well as the double headed action arrow Z representing the direction of movement of the wedge parts 32, 34 as a result of the wedging action). The tightening is completed until the position of the bracket 12 is fixed.

An additional advantage of the illustrated arrangement is that it allows for the adjustment to be easily made without first removing the engine E from the mounted position. Referring again to FIG. 3*c*, it should be appreciated that, when the second connector 38 is loose, the wedge parts 32, 34 may freely rotate along with the first connector 26. As a result, the head of the second connector 38 may be oriented such that it is fully accessible while the engine E is in the mounted position, such as from the top as shown in FIG. 3*c*. In other words, the second connector 38 for assisting in fixing the position of the bracket 12 relative to the base 14 is elongated in a direction generally perpendicular to the axis of rotation A, and may be oriented such that it can be fully accessed for tightening without removing the engine E from the mount 10. Preferably, the second connector 38 includes a hexagonal socket such that it maybe tightened or loosened using an elongated hex-head or Allen wrench (note action arrow H in FIG. 3*c*).

Modifications are possible in light of the foregoing teachings. For example, instead of using the wedge assembly W and cap 30, a nut could be tightened onto the corresponding end of first connector 26 for fixing the position of the bracket 12 relative to the base 14. As mentioned above, the downside of this arrangement is that it may be more difficult to access the nut for tightening without removing the engine E from the mounted position. However, access could still be gained using a hex-head nut and a tool such as an adjustable-width wrench. Also, the body 16 and arms 18 of the bracket 12 could be formed as unitary parts instead of separate parts integrally connected together. The mating surfaces of the bracket 12 and base 14 also need not be spherical to achieve the desired function (that is, two surfaces that are convex or concave in one direction only could still produce the desired result).

The foregoing description is provided for purposes of illustration. It is not intended to be exhaustive or to limit the invention to the precise form disclosed. The embodiment described above was chosen to provide the best application to thereby enable one of ordinary skill in the art to utilize the disclosed inventions in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. An adjustable mount for intended use with an engine for a model airplane having a firewall and a fuselage, the engine rotating a shaft operatively connected to or associated with a propeller about an axis of rotation, said mount comprising:

a bracket capable of supporting the engine, the bracket including a generally convex surface; and a base coupled to the bracket, the base having a first surface adapted for mating with the firewall and a second, generally concave surface opposite the first surface for mating with the convex surface of the bracket.

2. The mount according to claim 1, wherein the bracket comprises a body including the generally convex surface and a pair of arms adapted for supporting the engine.

3. The mount according to claim 2, wherein each arm is substantially L-shaped, and further including at least one fastener for securing the arm to the body.

4. The mount according to claim 1, wherein the bracket includes an opening through which a portion of a first connector extends.

5. The mount according to claim 4, wherein the first connector extending through the opening is secured at one end to the base and includes an oversized head at an opposite end, the mount further comprising:

a first wedge part on the first connector and associated with a structure having at least one dimension that exceeds a corresponding dimension of the opening in the bracket;

a second wedge part on the first connector, the second wedge part having a first side for engaging the first wedge part and a second side generally opposite the first side for engaging the oversized head;

a second connector oriented generally transverse to the first connector for connecting the first and second wedge parts, whereby upon tightening the second connector, the first and second wedge parts urge the bracket into engagement with the base by wedging action to thus fix the orientation of the axis of rotation.

6. The mount of claim 5, wherein the second connector is elongated in a direction substantially perpendicular to the axis of rotation of the shaft when the engine is substantially aligned with a centerline of the fuselage.

7. The mount of claim 5, wherein the structure associated with the first wedge part is one of a washer having a convex surface for engaging a concave surface of the bracket adjacent to or surrounding the opening or a peripheral flange on the first wedge part.

8. An adjustable mount for intended use with an engine for a model airplane having a firewall and a fuselage, the engine rotating a shaft operatively connected to or associated with a propeller about an axis of rotation, said mount comprising:

a bracket for supporting the engine;

a base adapted for mounting to the firewall and mating with the bracket; and a first connector operatively connected to or associated with the base;

a first wedge part on the first connector;

a matching second wedge part on the first connector;

a second connector oriented generally transverse to the first connector for connecting the first and second wedge parts, whereby upon tightening the second connector, the first and second wedge parts urge the bracket into engagement with the base by wedging action to thus fix the orientation of the axis of rotation.

9. The mount according to claim 8, wherein the bracket includes an opening and at least one dimension of a structure associated with the first wedge part exceeds a corresponding dimension of the opening, whereby the first wedge part is captured between the bracket and the second wedge part.

10. The mount of claim 9, wherein the structure associated with the second wedge part is one of a washer having a convex surface for engaging a concave surface of the bracket adjacent to or surrounding the opening or a peripheral flange on the second wedge part.

11. The mount according to claim 8, wherein the first connector includes an oversized head at one end for capturing the wedge parts.

12. The mount according to claim 11, wherein the first connector passes through a hole in the base and includes a second oversized head at the opposite end.

13. The mount of claim 8, wherein the second connector is elongated in a direction substantially perpendicular to the axis of rotation of the shaft when the engine is substantially aligned with a centerline of the fuselage.

14. The mount according to claim 8, wherein the bracket includes a generally convex surface and the base includes a first surface adapted for mating with the firewall and a generally concave surface opposite the first surface for mating with the convex surface of the bracket, whereby the bracket may be moved relative to the base to adjust or change the orientation of the axis of rotation with a position of a point along or at the end of the shaft remaining substantially the same.

15. An adjustable mount for intended use with an engine for a model airplane having a firewall and a fuselage, the engine rotating a shaft operatively connected to or associated with a propeller about an axis of rotation, said mount comprising:

means for adjusting or changing the orientation of the axis of rotation; and means for fixing the orientation of the axis of rotation.

16. The mount according to claim 15, wherein the adjusting means comprises:

a bracket for supporting the engine, the bracket including a generally convex surface;

a base coupled to the bracket, the base having a first surface adapted for mating with the firewall and a second, generally concave surface opposite the first surface for mating with the convex surface of the bracket.

17. The mount according to claim 16, wherein the fixing means comprises:

a first connector operatively connected to or associated with the base;

a first wedge part carried on the first connector;

a matching second wedge part carried on the first connector; and a second connector oriented generally transverse to the first connector for connecting the first and second wedge parts, whereby upon tightening the second connector, the first and second wedge parts urge the bracket into engagement with the base by wedging action to thus fix the orientation of the axis of rotation.

18. The mount according to claim 17, wherein the base includes an opening and at least one dimension of a structure associated with the first wedge part exceeds a corresponding dimension of the opening, whereby the first wedge part is captured between the bracket and the second wedge part.

19. A method of adjusting the orientation of an axis of rotation of a rotatable shaft in an engine operatively connected to or associated with a propeller on a model airplane, comprising changing the orientation of the axis of rotation with a position of one end of the shaft remaining substantially the same.

20. The method according to claim 19, further including fixing the orientation of the axis of rotation using a connector elongated in a direction generally perpendicular to the axis of rotation.

* * * * *